UNITED STATES PATENT OFFICE.

HERMANN SKRÖDER GERDES, OF BREMEN, GERMANY.

NONDUSTING GERM-KILLING LIME-NITROGEN MANURE AND PROCESS OF MAKING SAME.

1,405,202.  Specification of Letters Patent.  Patented Jan. 31, 1922.

No Drawing. Application filed February 24, 1921. Serial No. 447,574.

*To all whom it may concern:*

Be it known that I, HERMANN SKRÖDER GERDES, a citizen of the Free State of Prussia, in the German Republic, residing at Bremen, Germany, have invented Improvements in and Relating to a Process for the Manufacture of a Nondusting Germ-Killing Lime-Nitrogen Manure, and Processes of Making Same, (for which I have filed applications in Germany, June 11, 1917, and in Switzerland, April 14, 1919;) and I do hereby declare the following to be a full, clear, and exact description of the same.

The employment of lime nitrogen as an artificial manure has been prejudiced up to now on account of the troublesome property of dusting when strewed upon the field.

The problem to treat the lime nitrogen in such a manner that dusting will be prevented is not new. All experiments made hitherto however have shown to be unsuitable in practice and therefore are not used. The important question still remained unsolved in which manner the lime nitrogen may be deprived of its draw-back which in consequence of the corrosive properties acts injurious to persons and animals.

After many experiments the inventor has succeeded in attaining the aim strived for by treating the lime nitrogen with the heavy tar oils, or derivatives obtained from same, produced by the dry distillation of materials of organic origin, as for instance of coal, lignite, peat, wood, or other similar material; the one product I preferably apply for the purposes of my invention is carbolineum. The new process for the manufacture of a non dusting and at the same time germ killing lime nitrogen manure simply consists in that approximately from 2—6% of carbolineum is added to and finely distributed through the lime nitrogen in a suitable device, for instance a ball mill. By the term carbolineum I refer primarily to the product made according to the directions of the German Patent #46021 by which heavy tar oil is gently heated and then chlorinated by vigorously passing chlorine gas through the mass; but I do not restrict myself to this particular product exclusively, as the tar oils obtained by the dry distillation of material of organic origin, as for instance raw oil, anthracene oil, etc., answer the purpose of my invention as well, these products being chiefly hydrocarbons or derivatives of same, and chemically inert to the lime nitrogen.

By the above mentioned treatment of the lime nitrogen beside the troublesome property of dusting, the pasting together of the lime nitrogen when stored is prevented. The lime nitrogen when stored will always paste together if endeavors are made to prevent the dusting by mixing with aqueous solutions. The new product may equally be distributed and has an important effect upon the ground, which favors the growing of the plants and kills the germs. Consequently the crop will be increased as compared with the use of lime nitrogen only.

These advantages are not to be obtained by any other admixture, neither by aqueous solutions nor by vegetable or mineral oils and even not by an admixture of asphaltum. Such additions do not act permanently, the lime nitrogen after a certain time will become dusting again. This is impossible by the use of carbolineum. Carbolineum remains effective and keeps the lime nitrogen for years in a non dusting, spongy and strewable state, so that it comes into consideration now as an important export article.

It has further been found that carbolineum not only has the advantageous effect when mixed with pure lime nitrogen, but also when lime nitrogen in mixture with other substances is to be used which serve to favor the growing of plants. As an addition of this kind humus extract comes into consideration in first line. The latter is obtained in a well known manner by treating substances, as turf-moss, peat, lignite a.s.f., with solutions of substances, which react alcaline, and this extract may be added either in liquid or solid form.

It has already been proposed to add such humus extract to vegetable nutritious matters as phosphates, potassic salts or nitre, in order to increase their effect as manure and to kill germs injurious to animals and vegetables. This admixture has not yet come into consideration for lime nitrogen. According to the present invention carbolineum is to be added to the lime nitrogen in admixture also with alcaline humus or humus extract in a dry or liquid state.

Lastly it has been found that not only the products of distillation of coal tar, as carbolineum, so called raw oil anthrazene oil a.s.f. have the desired effect to prevent the dusting of the lime nitrogen during strewing and its pasting together during storing, but that other products of the carbon and wood distillation, as lignite tar oil, wood tar a.s.f. also are to be used with equal advantage.

The germ killing effect of the lime nitrogen manure also exists because lignite tar oil etc. also contains a certain quantity of phenol which brings about this action.

Having now described and ascertained the nature of my invention and the manner in which the same is to be performed I now declare what I claim and desire to secure by Letters Patent of the United States:

1. A process for the manufacture of a non dusting germ killing lime nitrogen manure, consisting in adding a product of the dry distillation of material of organic origin to the lime nitrogen, said product being chemically inert to the lime nitrogen.

2. A process for the manufacture of non-dusting germ killing lime nitrogen manure, consisting in adding a heavy tar oil obtained by the dry distillation of material of organic origin to the lime nitrogen.

3. A process for the manufacture of a non-dusting germ killing lime nitrogen manure, consisting in adding a derivative of a heavy tar oil obtained by the dry distillation of material of organic origin to the lime nitrogen.

4. A process for the manufacture of a non dusting germ killing lime nitrogen manure, consisting in adding carbolineum to the lime nitrogen.

5. A process for the manufacture of a non-dusting germ killing lime nitrogen manure, consisting in adding to the lime nitrogen a mixture of alkaline humus and a product obtained by the dry distillation of material of organic origin, said product being chemically inert to the lime nitrogen.

6. A process for the manufacture of a non dusting germ killing lime nitrogen manure consisting in adding a mixture of carbolineum and alkaline humus to the lime nitrogen.

7. As an article of manufacture, a manure comprising lime nitrogen and a product of the dry distillation of material of organic origin, said product being chemically inert to the lime nitrogen.

8. As an article of manufacture, a manure comprising lime nitrogen and carbolineum.

In testimony whereof, I have signed my name to this specification in the presence of two subscribing witnesses.

HERMANN SKRÖDER GERDES.

Witnesses:
  H. KLOCKGEBER,
  C. OELFKE.